(12) United States Patent
Sano (10) Patent No.: US 7,438,318 B2
(45) Date of Patent: Oct. 21, 2008

(54) INDUSTRIAL VEHICLE

(75) Inventor: Yasumasa Sano, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 32 days.

(21) Appl. No.: 11/486,755

(22) Filed: Jul. 14, 2006

(65) Prior Publication Data

US 2007/0017728 A1  Jan. 25, 2007

(30) Foreign Application Priority Data

Jul. 15, 2005 (JP) ............................. 2005-207441

(51) Int. Cl.
*B60R 21/13* (2006.01)

(52) U.S. Cl. ...................... 280/756; 180/326; 297/115; 297/116; 297/117

(58) Field of Classification Search ................ 280/756; 297/115, 116, 117, 251, 411.31, 411.32, 297/411.33, 411.34, 411.35, 411.38
See application file for complete search history.

(56) References Cited

U.S. PATENT DOCUMENTS

| | | | |
|---|---|---|---|
| 4,030,749 A | | 6/1977 | Strahm ......................... 297/345 |
| 4,097,088 A | * | 6/1978 | Meiller ....................... 297/411.38 |
| 4,141,586 A | * | 2/1979 | Goldner et al. ................ 297/167 |
| 4,165,901 A | * | 8/1979 | Swenson et al. ........... 297/411.33 |
| 4,176,878 A | * | 12/1979 | Koutsky ...................... 297/115 |
| 4,244,623 A | * | 1/1981 | Hall et al. ................. 297/411.36 |
| 4,307,913 A | * | 12/1981 | Spiegelhoff ............ 297/411.33 |
| 4,917,438 A | * | 4/1990 | Morgan ................... 297/411.37 |
| 5,749,629 A | | 5/1998 | Heath et al. |
| 5,853,223 A | * | 12/1998 | Ritt et al. ................. 297/411.36 |
| 5,873,633 A | * | 2/1999 | Lang et al. ................ 297/411.32 |
| 6,106,070 A | * | 8/2000 | Ritt et al. ................ 297/411.35 |
| 6,752,422 B2 | * | 6/2004 | Sauermann ................. 280/748 |
| 7,114,781 B2 | * | 10/2006 | Costaglia ................... 297/411.2 |
| 2002/0145325 A1 | * | 10/2002 | Clevenger ............... 297/411.32 |
| 2005/0006942 A1 | | 1/2005 | Bremner |

FOREIGN PATENT DOCUMENTS

| | | |
|---|---|---|
| DE | 10 2005 023 890 A1 | 12/2005 |
| EP | 1 350 667 A2 | 10/2003 |

(Continued)

OTHER PUBLICATIONS

European Search Report dated Mar. 29, 2007 issued by European Patent Office for application No. 06116971.0-1256.

*Primary Examiner*—Toan C To
(74) *Attorney, Agent, or Firm*—Morgan & Finnegan, LLP (57) ABSTRACT

An industrial vehicle includes a vehicle body, a hood provided on the vehicle body and operable to open and close, an operator's seat provided on the hood, a plurality of pillars erected on the vehicle body for supporting a headguard that covers above the operator's seat and an armrest provided at a side of the operator's seat such that the armrest is pivotable relative to the operator's seat or the hood on a pivotal axis in a longitudinal direction of the vehicle body. The pivotal axis has a first end adjacent to the operator's seat and a second end distant from the operator's seat. The pivotal axis is set such that the first end is located forward of the second end and/or such that the first end is located lower than the second end.

8 Claims, 10 Drawing Sheets

FOREIGN PATENT DOCUMENTS

| | | |
|---|---|---|
| EP | 1 350667 A2 | 10/2003 |
| EP | 1 350 667 A3 | 10/2006 |
| EP | 1 350667 A3 | 10/2006 |
| JP | 8-99800 | 4/1996 |
| JP | 08099800 | 4/1996 |

* cited by examiner

INDUSTRIAL VEHICLE

BACKGROUND

The present invention relates to an industrial vehicle which has an operator's seat and an armrest located on a hood.

A forklift truck has been widely used as an industrial vehicle for performing loading/unloading work in factories. Such forklift truck (mainly a counterbalanced forklift truck) is equipped with an operator's seat on which a vehicle operator is seated. Recently, some forklift trucks have an operator's seat which is equipped with an armrest for the purpose of reducing operator fatigue (cf. Japanese Patent Application Publication No. 8-99800). In the forklift truck which is disclosed in Japanese Patent Application Publication No. 8-99800, the armrest is provided at the operator's seat and made pivotable relative to the operator's seat for an operator to easily get on and off the forklift truck. In getting on or off the truck, the operator pivots the armrest toward the backrest of the seat.

Meanwhile, the operator's seat is generally provided on an engine hood in the case of an engine vehicle or on a battery hood in the case of a battery vehicle. These hoods are operable to open and close for daily checking. Since the operator's seat is provided on the hood, the operator's seat is pivoted as the hood is opened and closed. The width of the armrest may be made larger for enhancing the convenience of the armrest. In this case, however, there is fear that the armrest collides against a rear pillar supporting an overhead guard when the hood is opened. The widened armrest enhances the freedom of posture of the operator when he or she places his or her arm on such armrest. When operating means for a vehicle such as a joystick is disposed on the armrest as disclosed in Japanese Patent Application Publication No. 8-99800, a plurality of operating menas juxtaposed on the widened armrest enhances operating ease and convenience.

The present invention, which has been made in view of the above-described problems, is directed to an industrial vehicle which prevents the collision of the armrest with a pillar when the hood is opened.

SUMMARY

According to the present invention, an industrial vehicle includes a vehicle body, a hood provided on the vehicle body and operable to open and close, an operator's seat provided on the hood, a plurality of pillars erected on the vehicle body for supporting a headguard that covers above the operator's seat and an armrest provided at a side of the operator's seat such that the armrest is pivotable relative to the operator's seat or the hood on a pivotal axis in a longitudinal direction of the vehicle body. The pivotal axis has a first end adjacent to the operator's seat and a second end distant from the operator's seat. The pivotal axis is set such that the first end is located forward of the second end and/or such that the first end is located lower than the second end.

The present invention also provides an industrial vehicle which includes an operator's seat and an armrest connected to the operator's seat. The armrest includes a support member and an armrest main body supported by the support member. The support member includes a plurality of bracket members that slidably overlap with each other. The support member is provided such that the support member extends along the longitudinal direction of the vehicle body and is inclined upward from a rear of the vehicle body toward a front of the vehicle body when the armrest is located at a use position. A position of the armrest is adjustable in a vertical direction by slidably moving the bracket members.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

The following will describe a preferred embodiment of an industrial vehicle according to the present invention while having reference to FIGS. 1 through 9. The preferred embodiment will be described with reference to a case wherein the present invention is applied to a counterbalanced forklift truck. In the following description, the terms "forward," "rearward," "upward," "downward," "leftward" and "rightward" designate directions as viewed from an operator seated in the forklift truck and facing in the forward direction of the forklift truck.

Figure 1:
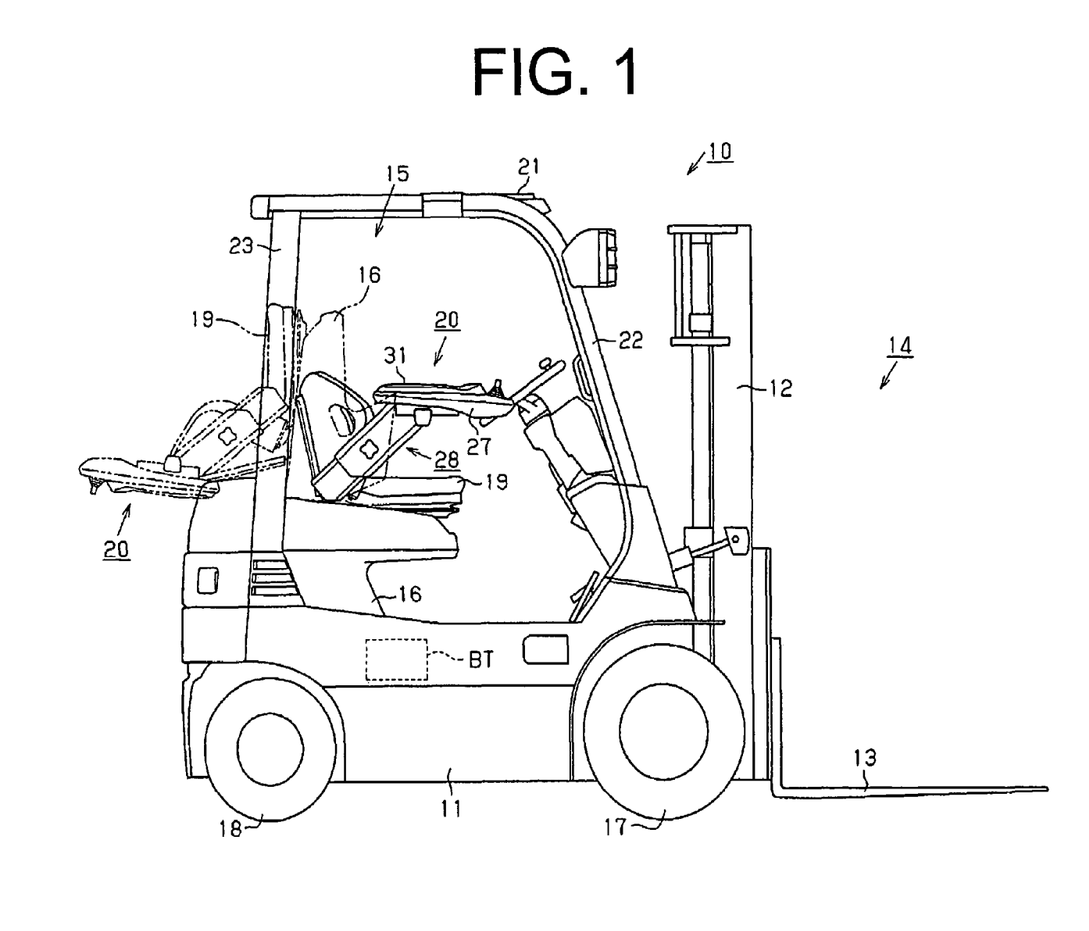
FIG. 1 is a side view of a forklift truck according to a preferred embodiment of the present invention.

Referring to FIG. 1, the forklift truck 10 includes a vehicle body 11 and a loading/unloading apparatus 14 which is provided at the front of the vehicle body 11 and includes a mast 12 and a fork 13. An operator's compartment 15 is provided in the center of the vehicle body 11. A battery hood 16 is provided in the rear of the vehicle body 11 for covering a battery BT which is installed in the vehicle body 11. Driving wheels (or front wheels) 17 are provided at the front lower portion of the vehicle body 11. Steered wheels 18 are provided at the rear lower portion of the vehicle body 11. The driving wheels 17 are connected to a drive motor (not shown)

which is accommodated in the vehicle body 11. The forklift truck 10 is of a battery type (or a battery vehicle) which is driven by the drive motor.

The following will describe the structure of the operator's compartment 15 in detail. In the operator's compartment 15, an operator's seat 19 is provided on the top of the battery hood 16 as a seat on which an operator can be seated. An armrest 20 is connected to the right side of the operator's seat 19 for the operator to put his or her arm thereon. The armrest 20 is pivotable in the longitudinal direction of the vehicle body 11. More specifically, the armrest 20 is pivotable or displaceable between two positions, namely a use position shown in FIG. 2 where an arm pad portion 31 of an armrest main body 27 of the armrest 20 on which the operator puts his or her arm is located substantially horizontally, and a non-use or retracted position shown in FIG. 3 where the arm pad portion 31 of the armrest 20 is located substantially upright.

Figure 2:
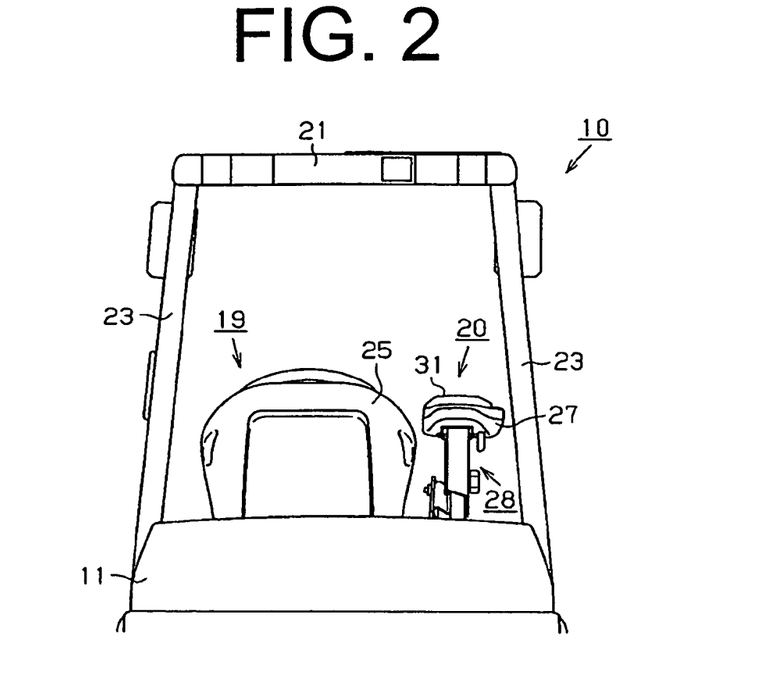
FIG. 2 is a rear view of the forklift truck with an armrest at its use position.
Figure 3:
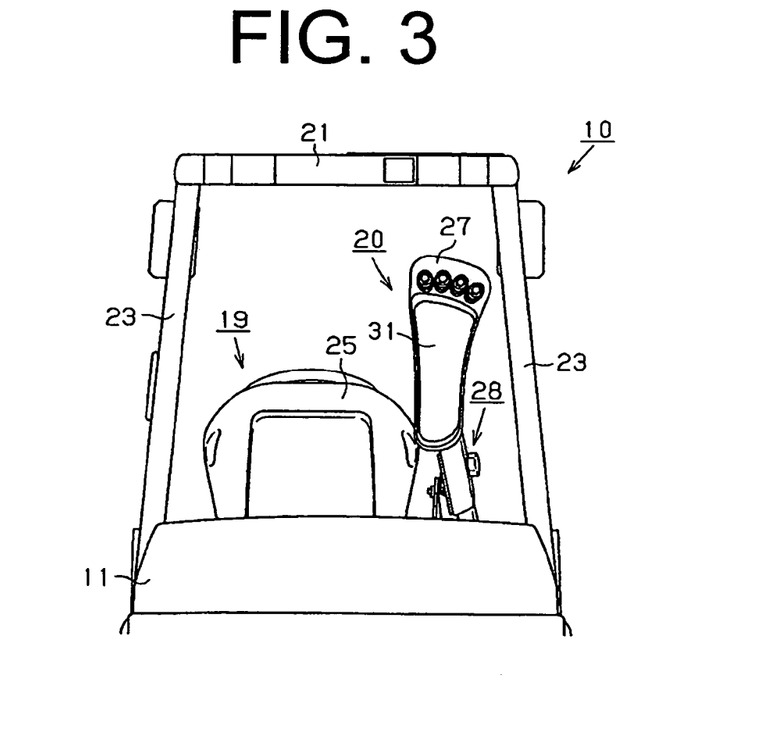
FIG. 3 is a rear view of the forklift truck with the armrest at its non-use position.

An overhead guard 21 is provided above the vehicle body 11 to cover the operator's compartment 15 for protecting the operator from falling objects. The overhead guard 21 is supported by a pair of front pillars 22 and a pair of rear pillars 23 which are erected on the vehicle body 11. The front pillars 22 are erected on the front of the vehicle body 11 at the right and left sides thereof, respectively. The rear pillars 23 are erected on the rear of the vehicle body 11 at the right and left sides thereof, respectively. As seen from each side of the forklift truck 10 (as seen from the right side of the forklift truck 10 in FIG. 1), the front and rear pillars 22 and 23 are erected such that the spaced interval therebetween is gradually narrowed toward the overhead guard 21. As seen from FIGS. 2 and 3 showing the forklift truck 10 in rear view, the paired rear pillars 23 are erected such that the spaced interval therebetween is gradually narrowed toward the overhead guard 21 and the front pillars 22 (not shown in FIGS. 2 and 3) are erected in the same manner. In the preferred embodiment, the lateral direction of the vehicle body 11 corresponds to a width direction of the vehicle body 11.

The battery hood 16 is connected to the vehicle body 11 such that it is pivotable in the longitudinal direction of the vehicle body 11 on a pivot axis extending laterally in the rear end of the vehicle body 11. The battery hood 16 is pivoted rearward thereby to open the battery compartment. The operator's seat 19 located on the battery hood 16 is pivotable together with the battery hood 16 in the longitudinal direction of the vehicle body 11. In FIG. 1, the position of the operator's seat 19 and the armrest 20 when the battery hood 16 is closed is indicated by solid line and the position of the same parts when the battery hood 16 is opened is shown by two-dot chain line.

Figure 4:
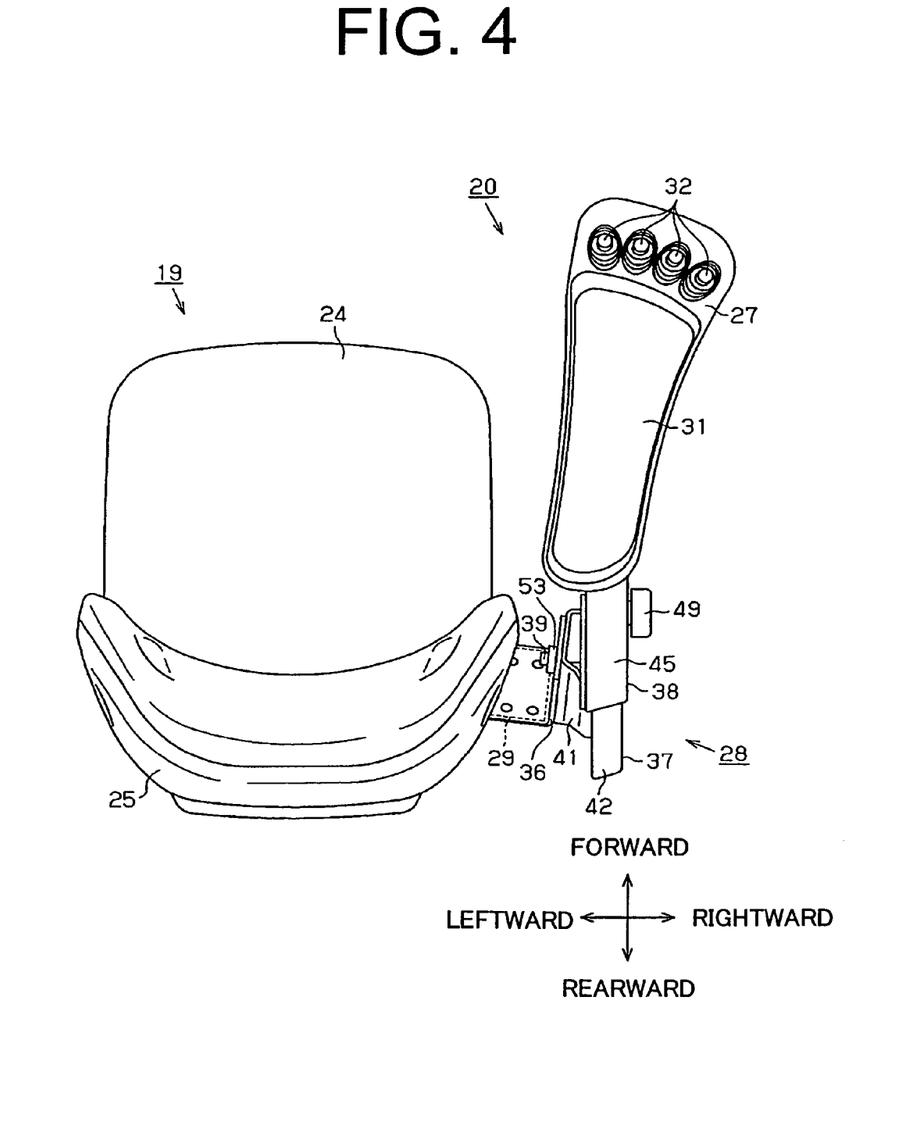
FIG. 4 is a top view of an operator's seat with the armrest at its use position.
Figure 5A:
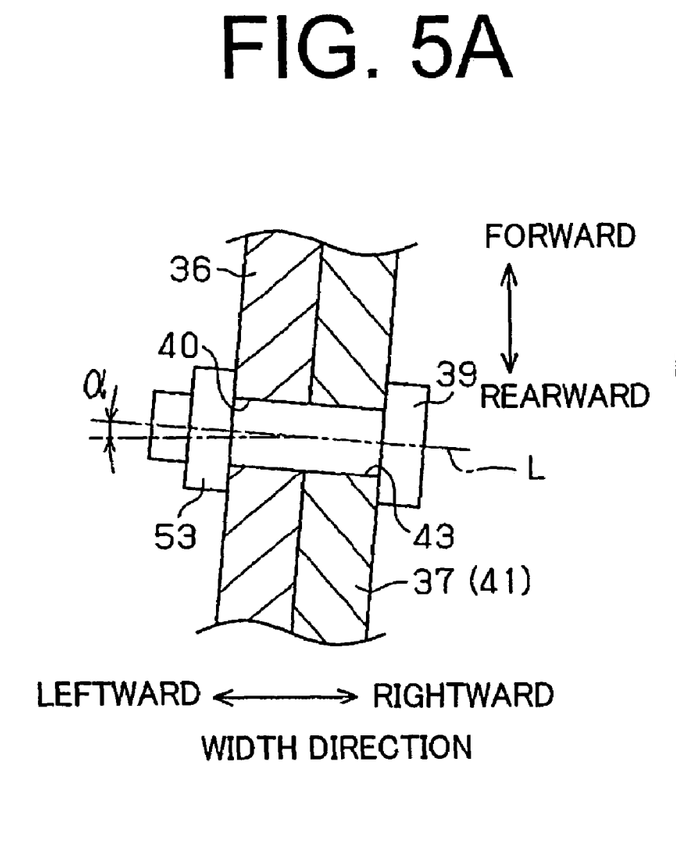
FIG. 5A is a cross-sectional top view of a pivotal shaft.
Figure 5B:
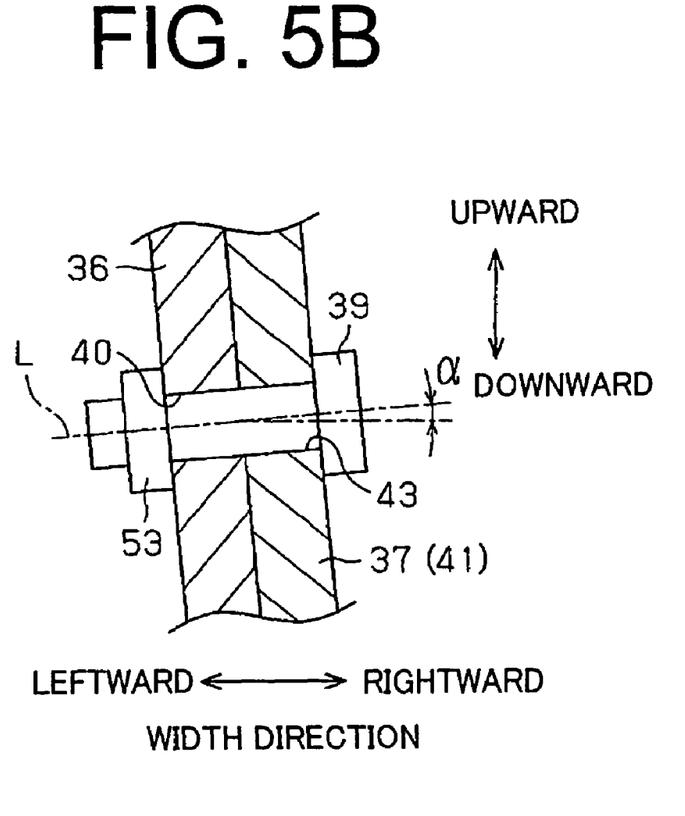
FIG. 5B is a cross-sectional rear view of the pivotal shaft.
Figure 6:
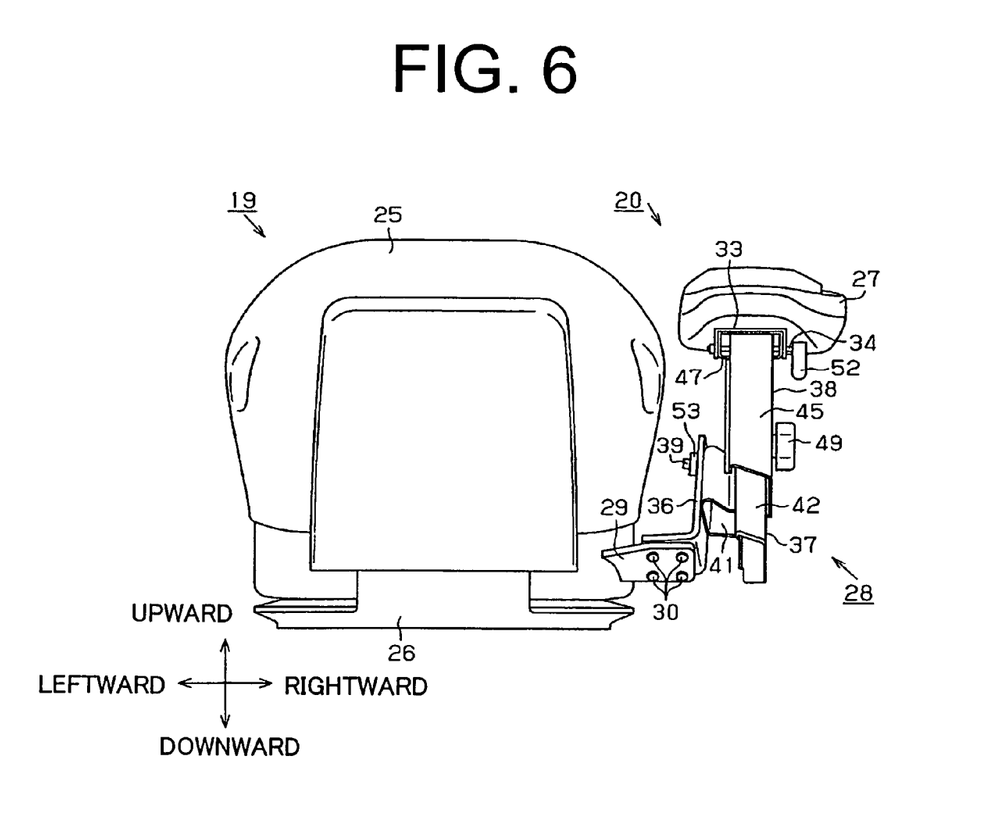
FIG. 6 is a rear view of the operator's seat with the armrest at its use position.
Figure 7:
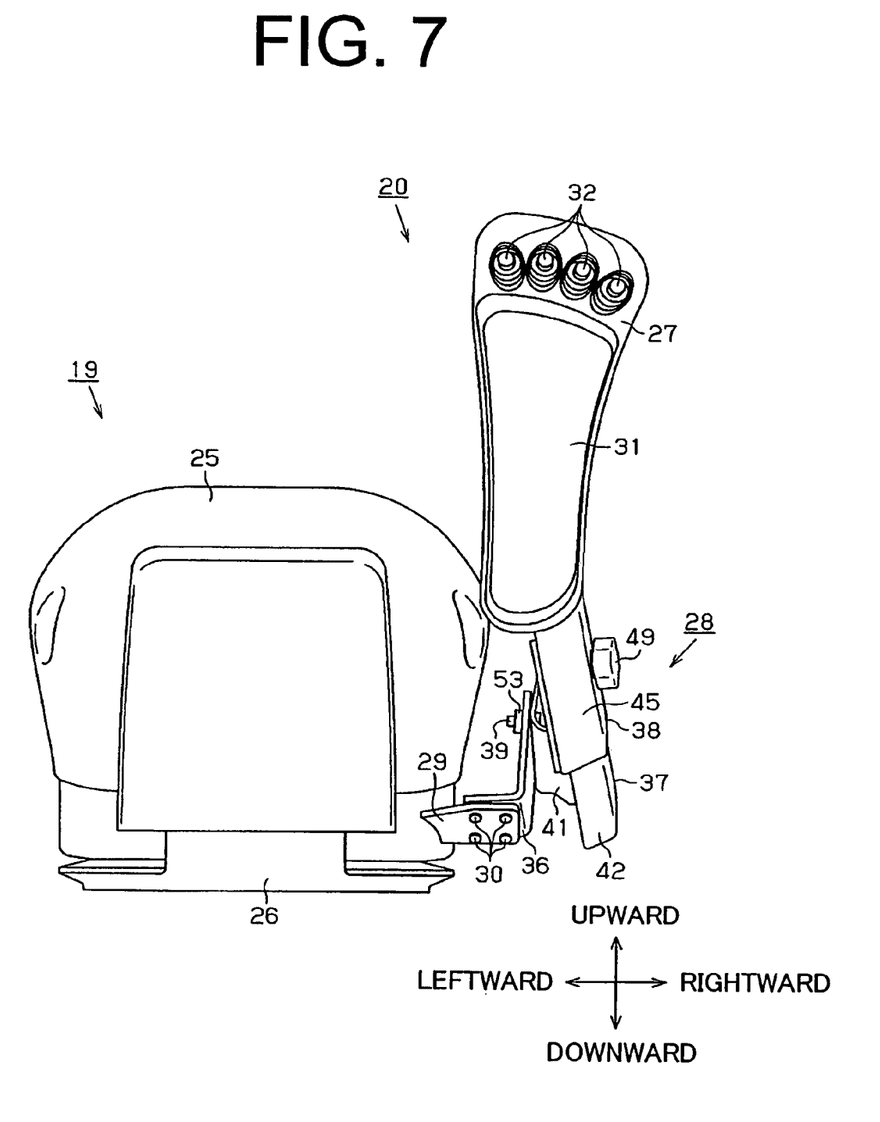
FIG. 7 is a rear view of the operator's seat with the armrest at its non-use position.
Figure 8:
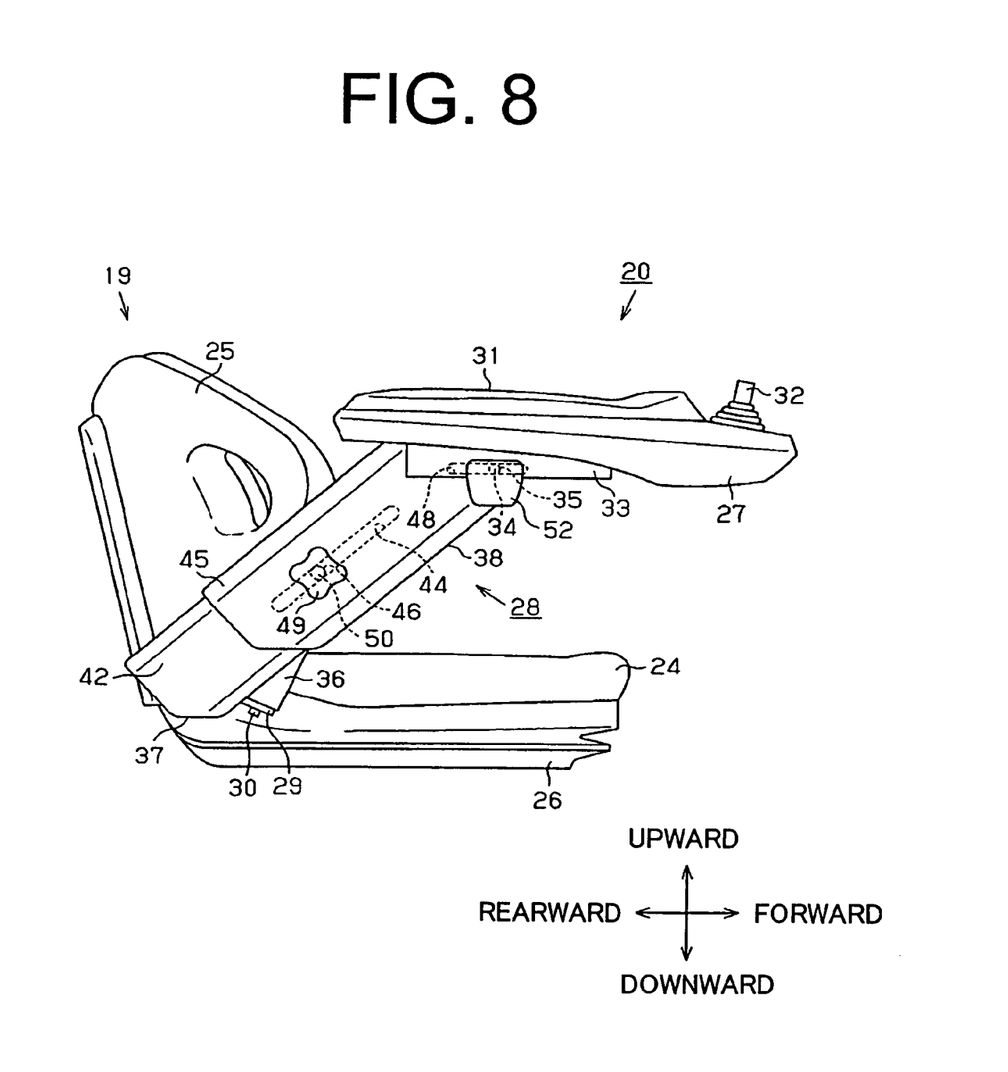
FIG. 8 is a right side view of the operator's seat with the armrest at its use position.
Figure 9:
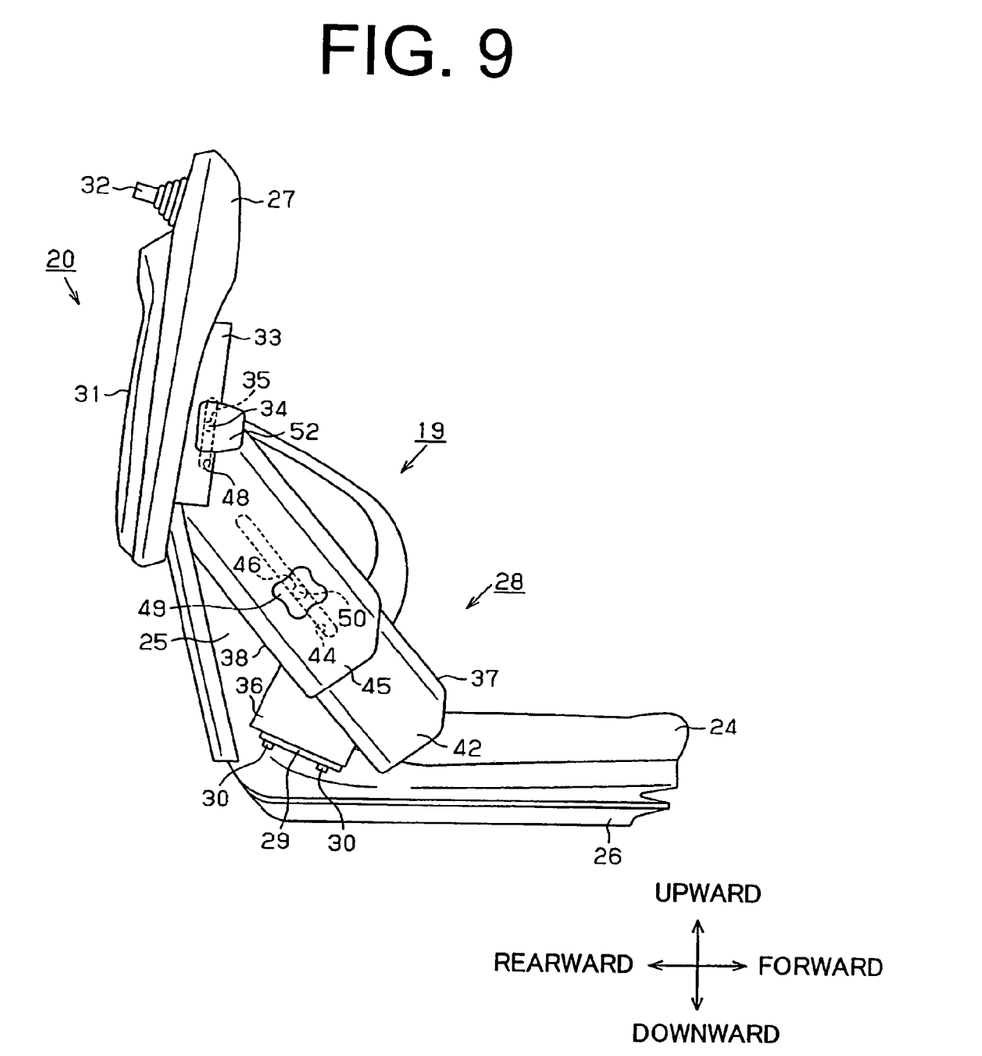
FIG. 9 is a right side view of the operator's seat with the armrest at its non-use position.

The following will describe the structure of the armrest 20 and the connection thereof to the operator's seat 19 with reference to FIGS. 4 through 9. FIG. 4 is a top view of the operator's seat 19 with the armrest 20 set at its use position. FIG. 6 is a rear view of the operator's seat 19 with the armrest 20 set at its use position. FIG. 7 is a rear view of the operator's seat 19 with the armrest 20 at its non-use position. FIG. 8 is a right side view of the operator's seat 19 with the armrest 20 set at its use position. FIG. 9 is a right side view of the operator's seat 19 with the armrest 20 set at its non-use position.

The operator's seat 19 includes a seat portion 24, a backrest portion 25 and a mounting seat 26 through which the operator's seat 19 is connected to the battery hood 16. The armrest 20 includes the armrest main body 27 and a mounting member 28 that connects the armrest main body 27 to the operator's seat 19. A fixing plate 29 is connected to the lower portion of the seat portion 24 of the operator's seat 19 such that the fixing plate 29 is inclined downward from the rear toward the front of the vehicle body 11. A plurality of fastening members 30 such as bolts are installed in the fixing plate 29. In the preferred embodiment, maximum four fastening members 30 are installed in the fixing plate 29. The four fastening members 30 are arranged in the fixing plate 29 in left and right rows, each row including a pair of right and left fastening members, as shown in FIG. 6.

The armrest main body 27 is made in the form of a box having a substantially rectangular shape in plan view. The armrest main body 27 includes the arm pad portion 31 which extends horizontally for the operator to put his or her arm thereon. The armrest main body 27 is provided such that when the armrest 20 is located at its use position as shown in FIGS. 4 and 8, the long side of the armrest main body 27 extends substantially in the longitudinal direction of the vehicle body 11. A plurality of operating members 32 (or four operating members in the preferred embodiment) which are used to operate actuators for loading/unloading such as a lift cylinder and a tilt cylinder are disposed on the front portion of the armrest main body 27. The operating members 32 are control levers which are juxtaposed on the armrest main body 27, as shown in FIG. 4. The operating members 32 include a lift lever for raising and lowering a fork and a tilt lever for tilting a mast forward and backward. A mounting plate 33 is provided below the armrest main body 27 for connecting the armrest main body 27 to the aforementioned mounting member 28. A hole 35 is formed in each side surface of the mounting plate 33 for receiving therethrough a bolt 34 as shown in FIGS. 6, 8 and 9.

The mounting member 28 includes a connecting bracket 36, a lower bracket 37 and an upper bracket 38. In the preferred embodiment, the lower and upper brackets 37, 38 comprise the support member of the present invention.

The connecting bracket 36 has four holes (not shown in the drawing) formed therethrough in the same arrangement as the holes in the fixing plate 29, and four fastening members 30 are installed through these holes and tightened thereby to fixedly connect the connecting bracket 36 to the fixing plate 29. The connecting bracket 36 which is thus connected to the fixing plate 29 is inclined forward as shown in FIGS. 8 and 9. The connecting bracket 36 has a hole 40 formed therethrough for receiving a pivotal shaft 39 therein. In the preferred embodiment, the position of the armrest 20 in the width direction of the vehicle body 11 is adjustable depending on a manner of fixing the connecting bracket 36 to the fixing plate 29. More specifically, when only the right pair of fastening members 30 in FIG. 6 is used for fixing the connecting bracket 36 to the fixing plate 29, the armrest 20 is located more rightward than the case wherein the four fastening members 30 are used for fixing in FIG. 6.

The lower bracket 37 includes a tubular connecting portion 41 which is connected to the connecting bracket 36 and a tubular lower bracket body 42 which is connected to the upper bracket 38. The connecting portion 41 has a hole 43 formed therethrough for receiving the pivotal shaft 39 therein. The lower bracket 37 is pivotable on the pivotal shaft 39 relative to the connecting bracket 36 in the longitudinal direction or the forward and backward directions of the vehicle body 11. The lower bracket 37 is located such that it is inclined upwardly from the rear toward the front of the operator's seat 19 when the armrest 20 is placed at its use position as shown in FIG. 8. An elongated guide hole 44 is formed in the side surface of the lower bracket body 42, extending straight along the longitudinal direction of the lower bracket 37 as shown in FIGS. 8 and 9.

The upper bracket 38 includes a tubular upper bracket body 45 which receives therein the lower bracket body 42 of the lower bracket 37. A fitting hole 46 is formed through the right-side plate of the upper bracket body 45 at a position corresponding to the guide hole 44 of the lower bracket 37 as shown in FIGS. 8 and 9. The upper bracket body 45 is formed at its top end with a slide guide 47. The slide guide 47 is provided at the upper bracket body 45 such that when the armrest 20 is located at its use position, the slide guide 47 extends in the horizontal and longitudinal direction. A guide hole 48 is formed in the side surface of the slide guide 47, extending straight along the slide guide 47 as shown in FIGS. 8 and 9.

The upper bracket 38 which is installed over or overlaps with the lower bracket 37, as shown in FIG. 8, is fixed thereto by means of a bolt 50 which is inserted through the fitting hole 46 and the guide hole 44 of the lower bracket 37 and tightened securely. For this purpose, the bolt 50 has a nut plate (not shown) at the end thereof opposite to the end having a control knob 49. The upper bracket 38 is disposed such that when the armrest 20 is located at its use position, the upper bracket 38 is inclined upwardly from the rear toward the front of the operator's seat 19 as shown in FIG. 8. Loosening the bolt 50 by turning the control knob 49 and then moving the bolt 50 along the guide hole 44, the upper bracket 38 becomes slidably movable relative to the lower bracket 37. This slide movement of the upper bracket 38 makes possible vertical adjustment of the armrest main body 27. Since the lower bracket 37 and the upper bracket 38 are inclined, the armrest main body 27 moves in the longitudinal direction of the vehicle body 11 while moving in the vertical direction. That is, the armrest main body 27 is moved forward while moving upward, and is moved rearward while moving downward.

The armrest main body 27 is located such that it covers the slide guide 47 of the upper bracket 38. The armrest main body 27 is fixed to the slide guide 47 of the upper bracket 38 by means of the bolt 34 which is inserted through the hole 35 and the guide hole 48 of the slide guide 47 and tightened by a control knob 52 provided at one end of the bolt 34. Thus, loosening the bolt 34 by turning the control knob 52, the armrest main body 27 becomes slidably movable relative to the slide guide 47 in the longitudinal direction for adjustment of the armrest main body 27 in the longitudinal direction.

The following will describe the connection between the connecting bracket 36 and the lower bracket 37. The pivotal shaft 39 is inserted through the hole 43 formed in the connecting portion 41 of the lower bracket 37. The pivotal shaft 39 is also inserted at its end through the hole 40 of the connecting bracket 36 and a fixing member 53 such as a nut is installed on the end of the pivotal shaft 39. The lower bracket 37 is connected to the connecting bracket 36 by tightening the fixing member 53 on the pivotal shaft 39. Due to this connection, the lower bracket 37 is pivotably supported by the connecting bracket 36 and the armrest 20 is pivotable on the pivotal shaft 39 relative to the operator's seat 19 in the longitudinal direction of the vehicle body 11. The connecting portion 41 of the lower bracket 37 has a pivot-regulating hole (not shown) formed therein in the shape of an arc and a guide pin is mounted on the connecting bracket 36 for engagement with the hole thereby to regulate the pivotal movement of the lower bracket 37. With the connecting bracket 36 connected to the lower bracket 37, the guide pin is slidably inserted in the pivot-regulating hole and the pivoting movement of the lower bracket 37 (or the armrest 20) is regulated by contact of the guide pin with the opposite ends of the pivot-regulating hole.

Referring to FIGS. 5A and 5B, the pivotal axis or the central axis L of the pivotal shaft 39 is inclined at a predetermined angle α (i.e. 3 to 8 degrees) with respect to the width direction or the horizontal lateral direction of the vehicle body 11. More specifically, as shown in FIG. 5A in which the armrest 20 is located on the right side of the operator's seat 19, the central axis L of the pivotal shaft 39 is inclined downward from left to right with respect to the width direction of the vehicle body 11 as the connection between the connecting bracket 36 and the lower bracket 37 is seen from above the vehicle body 11. In FIG. 5A, the left side of the pivotal shaft 39 or the left end (a first end) of the central axis L is located forward of the right side of the pivotal shaft 39 or the right end (a second end) of the central axis L.

As shown in FIG. 5B in which the armrest 20 is located on the right side of the operator's seat 19, the central axis L of the pivotal shaft 39 is inclined upwardly from left to right with respect to the width direction of the vehicle body 11 as the connection between the connecting bracket 36 and the lower bracket 37 is seen from behind the vehicle body 11. In FIG. 5B, the left side of the pivotal shaft 39 or the left end of the central axis L is located lower than the right side of the pivotal shaft 39 or the right end of the central axis L.

The armrest 20 thus connected is pivotable on the pivotal shaft 39 in the longitudinal direction of the vehicle body 11 and, therefore, it is displaceable relative to the operator's seat 19 (or the battery hood 16). When the armrest 20 is pivoted forward as shown in FIG. 2, the armrest main body 27 is substantially horizontal and located on the right side of the seat portion 24 of the operator's seat 19 (cf. FIG. 4). In this state, the armrest 20 is located at its use position where the operator can put his or her arm on the armrest 20. When the battery hood 16 is opened with the armrest 20 at its use position, the armrest main body 27 collides with the rear pillar 23 on the right side. Since the armrest main body 27 is widened for juxtaposing the operating members 32 thereon in this preferred embodiment, the armrest main body 27 is more likely to collide with the rear pillar 23.

When the armrest 20 is pivoted rearward as shown in FIG. 3, on the other hand, the armrest main body 27 is brought to a substantially upright position on the right side of the backrest portion 25 of the operator's seat 19. In this state, the armrest 20 is located at its non-use position. In the armrest 20 of the preferred embodiment, the central axis L of the pivotal shaft 39 is inclined at the predetermined angle α with respect to the width direction or the horizontal lateral direction of the vehicle body 11 as described above. Thus, the armrest main body 27 is pivoted rearward along a path which is different from the path followed when the central axis L is set parallel to the width direction of the vehicle body 11. If the central axis L is set parallel to the width direction of the vehicle body 11, the armrest main body 27 is pivoted rearward straight along the longitudinal direction of the vehicle body 11 from the use position of the armrest 20. In other words, the armrest main body 27 is pivoted rearward from the use position of the armrest 20 while maintaining the same distance spaced between the operator's seat 19 and the armrest main body 27 when the armrest 20 is at its use position.

In the preferred embodiment, the armrest main body 27 is moved inwardly or toward the operator's seat 19 as the armrest main body 27 is pivoted rearward from the use position of the armrest 20. Thus, the armrest main body 27 with the armrest 20 retracted to the non-use position is inclined leftward or toward the operator's seat 19 as seen from behind the vehicle body 11 in FIG. 7. In the non-use position of the armrest 20, the armrest main body 27 is located more inwardly or closer to the operator's seat 19 than when the armrest 20 is at its use position. Therefore, when the battery hood 16 is opened with the armrest 20 at its non-use position, the collision between the armrest 20 and the rear pillar 23 on the right side is prevented. In the forklift truck 10 wherein the rear pillars 23 are provided such that the spaced interval therebetween is gradually narrowed toward the overhead guard 21 as in the forklift truck 10 of the preferred embodiment, since the armrest main body 27 is moved inwardly while being pivoted rearward, the armrest 20 is inclined leftward and located along the rear pillar 23 on the right side. Thus, the collision between the armrest 20 and the rear pillar 23 on the right side is prevented.

According to the preferred embodiment, the following advantageous effects may be obtained.

(1) The pivotal shaft 39 is disposed with its central axis L inclined downwardly from left to right with respect to the width direction of the vehicle body 11 as seen from above the vehicle body 11 and inclined upwardly from left to right with respect to the width direction of the vehicle body 11 as seen from behind the vehicle body 11. Due to such inclined disposition of the pivotal shaft 39, the armrest 20 is pivoted on the central axis L along such a path that the armrest 20 is moved toward the operator's seat 19 while being pivoted rearward. Thus, when the armrest 20 is pivoted rearward, the armrest 20 is inclined leftward as seen from behind the vehicle body 11. Therefore, if the width of armrest 20 is made larger, the collision between the armrest 20 and the rear pillar 23 during opening of the battery hood 16 is prevented by pivoting the armrest 20 rearward before opening the battery hood 16.

(2) The pivotal shaft 39 is set such that its central axis L is inclined with respect to the width direction of the vehicle body 11 as seen both from above the vehicle body 11 and from behind the vehicle body 11. When the armrest 20 is pivoted rearward, the armrest 20 is located more inwardly or closer to the operator's seat 19 than the case wherein the pivotal shaft 39 is disposed with its central axis L inclined with respect to the width direction of the vehicle body 11 as seen either from above the vehicle body 11 or from behind the vehicle body 11. Therefore, the collision between the armrest 20 and the rear pillar 23 is more reliably prevented.

(3) By permitting the armrest 20 to be pivoted while moving toward the operator's seat 19, the collision between the armrest 20 having an increased width and the rear pillar 23 is prevented. Furthermore, even when the rear pillars 23 are provided such that the spaced interval therebetween is gradually narrowed toward the overhead guard 21, the collision between the armrest 20 and the rear pillar 23 is prevented. By so providing the rear pillars 23, the design of the vehicle body 11 may be improved and, furthermore, the overhead guard 21 can be constructed with a minimum size as compared to the case where the rear pillars 23 are provided parallel to each other and hence made with less cost.

(4) The armrest main body 27 needs to be located at a position where an operator puts his or her arm thereon. Thus, if the mounting member 28 is provided upright, it needs to be connected to the side of the seat portion 24. When the mounting member 28 is provided upright, the mounting member 28 can be connected to the rear of the side of the seat portion 24. In this case, however, the mounting member 28 has to be manufactured such that the armrest main body 27 is located at the side of the operator. This causes the mounting member 28 to be large in size. In the above-described embodiment, on the other hand, the mounting member 28 is provided such that it is inclined forward. Thus, when the mounting member 28 (the armrest 20) is connected to the rear of the side of the operator's seat 19, the armrest main body 27 is located at the side of the operator without making the mounting member 28 larger. By so connecting, the side of the operator's seat 19 is fully opened when the armrest 20 is pivoted rearward to its retracted position. This makes it easier for the operator to get on and off the forklift truck 10.

(5) The connection between the fixing plate 29 and the connecting bracket 36 makes it possible to adjust the position of the armrest 20 in the lateral direction of the vehicle body 11. Thus, the armrest 20 may be located at a position suited for the body type of an operator, which provides comfort in operating the forklift truck 10. Therefore, the user-friendliness of the armrest 20 is improved.

The above preferred embodiment may be modified into various alternative embodiments, as exemplified below.

Figure 10A:
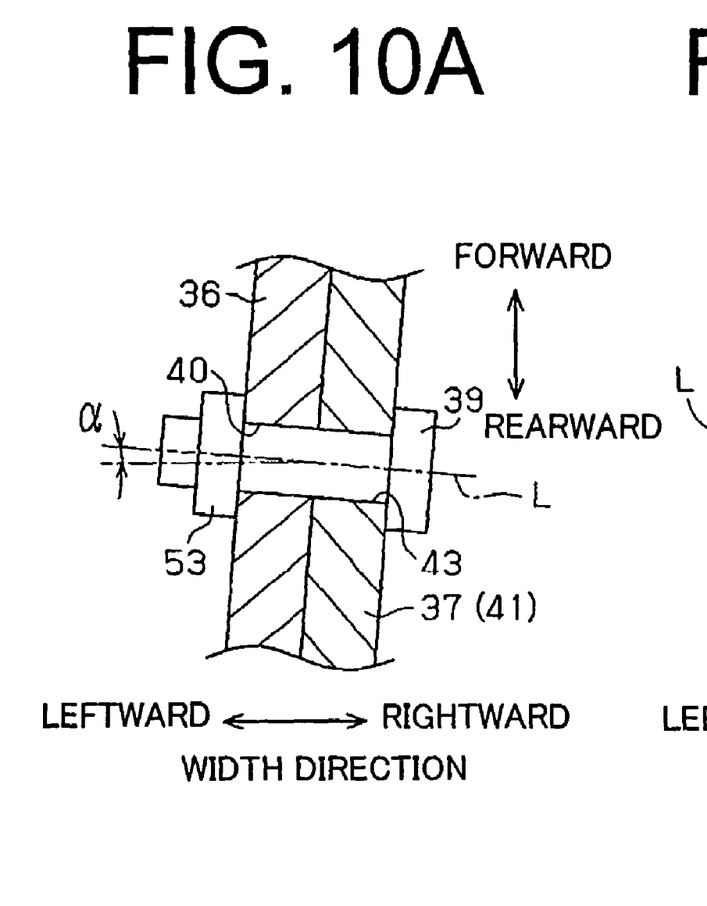
FIG. 10A is a cross-sectional top view of a pivotal shaft according to an alternative embodiment.
Figure 10B:
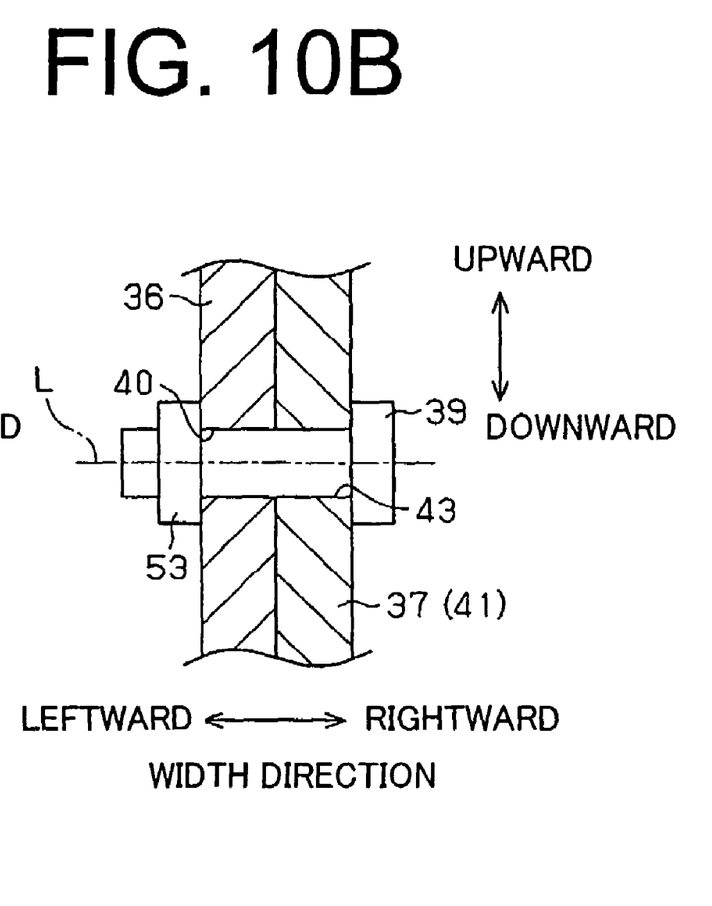
FIG. 10B is a cross-sectional rear view of the pivotal shaft according to the alternative embodiment.

In a modified embodiment of the present invention, the central axis L of the pivotal shaft 39 may be set as shown in FIGS. 10A and 10B. Namely, the pivotal shaft 39 is set with its central axis L inclined downwardly from left to right with respect to the width direction of the vehicle body 11 as seen from above the vehicle body 11 as shown in FIG. 10A. Simultaneously, the pivotal shaft 39 is set with the axis L thereof extending parallel to the width direction of the body as seen from behind the vehicle body 11 as shown in FIG. 10B. According to this setting, the armrest 20 is pivoted such that the armrest main body 27 is moved inwardly in a manner similar to the preferred embodiment.

Figure 11A:
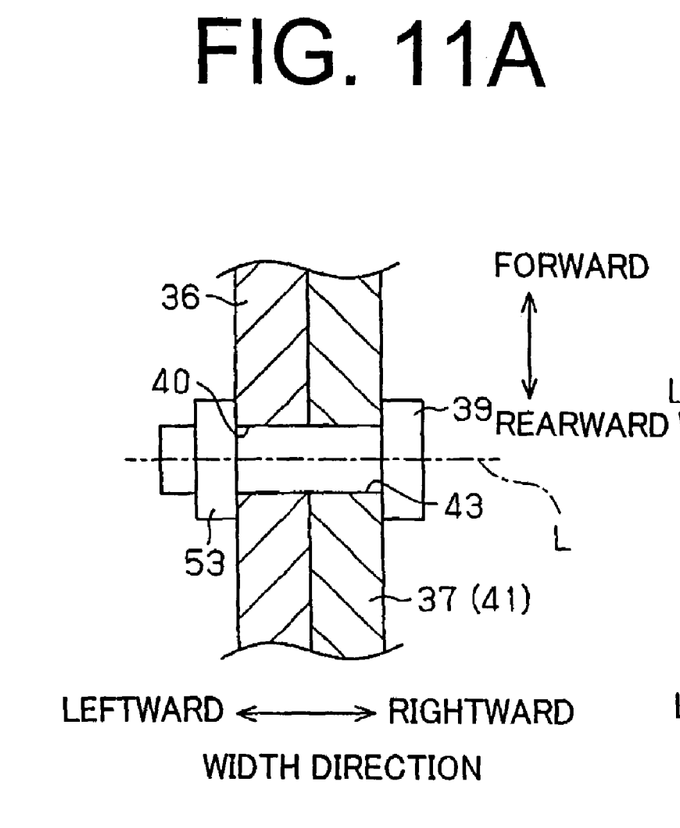
FIG. 11A is a cross-sectional top view of a pivotal shaft according to an alternative embodiment.
Figure 11B:
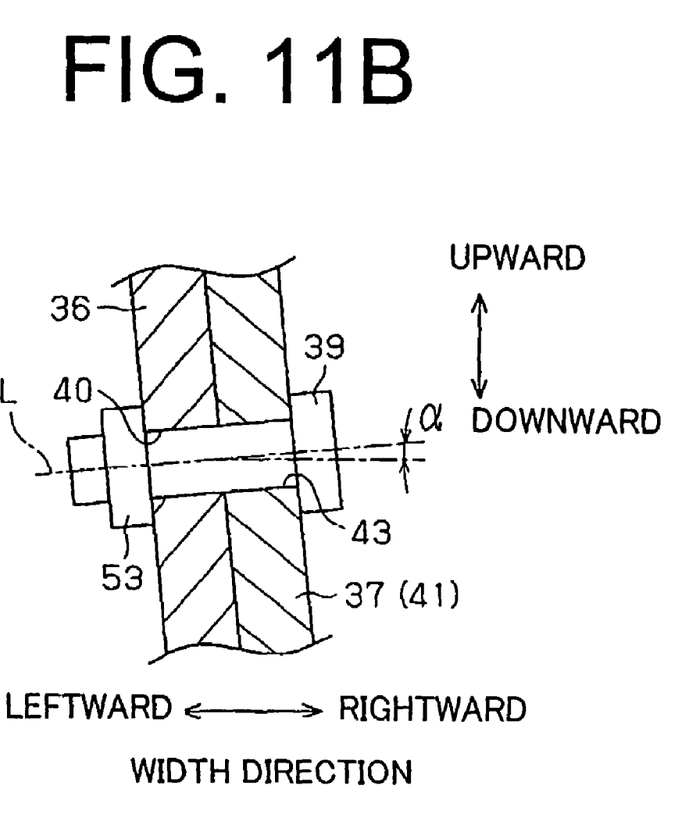
FIG. 11B is a cross-sectional rear view of the pivotal shaft according to the alternative embodiment.

In a further modified embodiment, the pivotal shaft 39 may be disposed with its central axis L set as shown in FIGS. 11A and 11B. Namely, the pivotal shaft 39 is disposed with its central axis L set parallel to the width direction of the body as seen from above the vehicle body 11 as shown in FIG. 11A. Simultaneously, the pivotal shaft 39 is disposed with the central axis L inclined upwardly from left to right with respect to the width direction of the vehicle body 11 as seen from behind the vehicle body 11, as shown in FIG. 11B. According to this setting, the armrest 20 is pivoted such that the armrest main body 27 is moved inwardly in a manner similar to the preferred embodiment.

The present invention is applied to the battery forklift truck 10 in the above preferred embodiment. However, the present invention is also applicable to an engine-powered forklift truck. In the case of such vehicle, an engine hood is provided so as to cover an engine installed in the vehicle body 11, and the operator's seat is provided on the engine hood.

Though present invention has been described for the forklift truck 10 in the above preferred embodiment, the present invention is applicable to other types of industrial vehicles. In a modified embodiment, the rear pillars 23 may be provided upright.

In a modified embodiment of the present invention, the operating members 32 do not have to be provided on the armrest main body 27. The armrest main body 27 is supported by the lower bracket 37 and the upper bracket 38 in the above preferred embodiment. However, the armrest main body 27 may be supported, for example, by three telescopically slidable brackets which overlap with each other.

According to a modification of the present invention, the armrest 20 may be provided on the battery hood 16. Furthermore, the angle α at which the central axis L of the pivotal shaft 39 is inclined with respect to the width direction of the body may be changed as required. In this case, the angle α as seen from above the vehicle body 11 may be the same as or different from the angle α as seen from behind the vehicle body 11.

In a further modified embodiment, the number of fastening members 30 which are installed in the fixing plate 29 and of the connecting bracket 36 may be changed as required. Thus, the range of the adjustable position of the armrest 20 in the lateral direction can be changed. Alternatively, a slide mechanism may be provided between the fixing plate 29 and the connecting bracket 36, and the connecting bracket 36 is slidably moved thereby to adjust the position of the armrest 20 in the lateral direction.

According to the present invention, the armrest 20 may be provided on the left side of the operator's seat 19. In this case, the central axis L of the pivotal shaft 39 will be in symmetrical relation to that in the preferred embodiment. Namely, the axis L is inclined upwardly from right to left with respect to the width direction of the vehicle body 11 as seen from above the vehicle body 11 and downwardly from right to left with respect to the width direction of the vehicle body 11 as seen from behind the vehicle body 11.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. An industrial vehicle comprising:
   a vehicle body;
   a hood provided on the vehicle body and operable to open and close;
   an operator's seat provided on the hood;
   a plurality of pillars erected on the vehicle body for supporting a headguard that covers above the operator's seat; and
   an armrest provided at a side of the operator's seat such that the armrest is pivotable relative to the operator's seat or the hood on a pivotal axis in a longitudinal direction of the vehicle body, the pivotal axis having a first end adjacent to the operator's seat and a second end distant from the operator's seat, the pivotal axis being set such that the first end is located forward of the second end and/or such that the first end is located lower than the second end.

2. The industrial vehicle according to claim 1, wherein the armrest includes a support member and an armrest main body supported by the support member, the support member including a plurality of bracket members that slidably overlap with each other, the support member being provided such that the support member extends along the longitudinal direction of the vehicle body and is inclined upward from a rear of the vehicle body toward a front of the vehicle body when the armrest is located at a use position, a position of the armrest being adjustable in a vertical direction by slidably moving the bracket members.

3. The industrial vehicle according to claim 1, wherein the armrest is configured such that a position of the armrest is adjustable in a width direction of the vehicle body.

4. The industrial vehicle according to claim 1, wherein the armrest is located at a right side of the operator's seat.

5. The industrial vehicle according to claim 1, wherein the armrest is connected to a rear of the side of the operator's seat.

6. The industrial vehicle according to claim 1, wherein the plurality of pillars includes a pair of front pillars provided at a front of the vehicle body and a pair of rear pillars provided at a rear of the vehicle body, the rear pillars being provided such that an interval therebetween is gradually narrowed toward the overhead guard.

7. The industrial vehicle according to claim 1, wherein the pivotal axis is inclined with respect to the width direction of the vehicle body at a predetermined angle.

8. The industrial vehicle according to claim 7, the predetermined angle ranges from 3 to 8 degrees.

* * * * *

UNITED STATES PATENT AND TRADEMARK OFFICE
CERTIFICATE OF CORRECTION

PATENT NO. : 7,438,318 B2
APPLICATION NO. : 11/486755
DATED : October 21, 2008
INVENTOR(S) : Yasumasa Sano It is certified that error appears in the above-identified patent and that said Letters Patent is hereby corrected as shown below:

On the Title Page, Page 2, Item -56- under "FOREIGN PATENT DOCUMENTS", please delete "EP 1 350667 A2 10/2003";

On the Title Page, Page 2, Item -56- under "FOREIGN PATENT DOCUMENTS", please delete "EP 1 350667 A3 10/2006";

On the Title Page, Page 2, Item -56- under "FOREIGN PATENT DOCUMENTS", please delete "JP 08099800 4/1996";

Column 1, lines 34-35, please delete "a plurality of operating menas" and insert therefore -- a plurality of operating means --;

Column 4, lines 3-4, please delete "In the preferred embodiment, maximum four fastening members 30" and insert therefore -- In the preferred embodiment, a maximum of four fastening members 30 --;

Column 8, line 42, please delete "Though present invention has been described" and insert therefore -- Though the present invention has been described --; and In Claim 8, column 10, lines 32-33, please delete "the predetermined angle ranges from 3 to 8 degrees." and insert therefore -- wherein the predetermined angle ranges from 3 to 8 degrees. --.

Signed and Sealed this

Twenty-fifth Day of August, 2009

David J. Kappos
*Director of the United States Patent and Trademark Office*